US008769932B2

(12) United States Patent
Gonze et al.

(10) Patent No.: US 8,769,932 B2
(45) Date of Patent: Jul. 8, 2014

(54) COLD START $NO_2$ GENERATION SYSTEM

(75) Inventors: Eugene V. Gonze, Pinckney, MI (US); Michael J. Paratore, Jr., Howell, MI (US); Chang H. Kim, Rochester, MI (US); Steven J. Schmieg, Troy, MI (US)

(73) Assignee: GM Global Technology Operations LLC

( * ) Notice: Subject to any disclaimer, the term of this patent is extended or adjusted under 35 U.S.C. 154(b) by 232 days.

(21) Appl. No.: 13/272,696

(22) Filed: Oct. 13, 2011

(65) Prior Publication Data
US 2013/0091826 A1   Apr. 18, 2013

(51) Int. Cl.
*F01N 3/00* (2006.01)

(52) U.S. Cl.
USPC .................. 60/284; 60/285; 60/299; 60/300

(58) Field of Classification Search
USPC .............................. 60/274–324; 422/177, 180
See application file for complete search history.

(56) References Cited

U.S. PATENT DOCUMENTS

| 6,725,647 | B2 * | 4/2004 | Pfeifer et al. | 60/274 |
| 6,742,329 | B2 * | 6/2004 | Miura et al. | 60/285 |
| 6,877,313 | B1 * | 4/2005 | Phillips et al. | 60/297 |
| 8,475,753 | B2 * | 7/2013 | Eckhoff et al. | 423/213.2 |
| 2009/0158719 | A1 * | 6/2009 | Hallstrom et al. | 60/297 |
| 2009/0301437 | A1 * | 12/2009 | Mizoguchi et al. | 123/443 |
| 2010/0098609 | A1 * | 4/2010 | Colliou | 423/213.2 |
| 2010/0101218 | A1 * | 4/2010 | Gabe et al. | 60/286 |
| 2010/0107605 | A1 * | 5/2010 | Brinkman et al. | 60/274 |
| 2011/0005201 | A1 * | 1/2011 | Raatz | 60/274 |
| 2012/0060472 | A1 * | 3/2012 | Li et al. | 60/274 |
| 2013/0006504 | A1 * | 1/2013 | Schreurs | 701/108 |

* cited by examiner

*Primary Examiner* — Jesse Bogue

(57) ABSTRACT

A cold start $NO_2$ generation system includes a catalyst control module that identifies a portion of a three-way catalyst that corresponds to a nitrogen dioxide zone. A diagnostic module determines a temperature in the nitrogen dioxide zone, and a fuel control module adjusts an air/fuel ratio based on the temperature in the nitrogen dioxide zone. A cold start $NO_2$ generation method includes identifying a portion of a three-way catalyst that corresponds to a nitrogen dioxide zone. The method further includes determining a temperature in the nitrogen dioxide zone and adjusting an air/fuel ratio based on the temperature in the nitrogen dioxide zone.

28 Claims, 3 Drawing Sheets

COLD START NO₂ GENERATION SYSTEM

FIELD

The present disclosure relates to cold start emission strategies, and more particularly to maximization of $NO_2$ generation during a cold start of an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Combustion in an engine results from ignition of a compressed air/fuel mixture in a cylinder of the engine. The exhaust gas resulting from combustion of the air/fuel mixture is expelled to an exhaust system. One or more engine parameters affecting the quantities of air and fuel in the air/fuel mixture may be adjusted by a controller based on signals from various sensors that are located in the exhaust system. The temperature of the engine will also affect the quantities of air and fuel in the air/fuel mixture. For example, during a cold start of the engine, the air/fuel mixture may be more heavily concentrated with fuel and then becomes less concentrated as the temperature of the engine increases.

SUMMARY

A cold start $NO_2$ generation system includes a catalyst control module that identifies a portion of a three-way catalyst that corresponds to a nitrogen dioxide zone. A diagnostic module determines a temperature in the nitrogen dioxide zone, and a fuel control module adjusts an air/fuel ratio based on the temperature in the nitrogen dioxide zone.

A cold start $NO_2$ generation method includes identifying a portion of a three-way catalyst that corresponds to a nitrogen dioxide zone. The method further includes determining a temperature in the nitrogen dioxide zone and adjusting an air/fuel ratio based on the temperature in the nitrogen dioxide zone.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
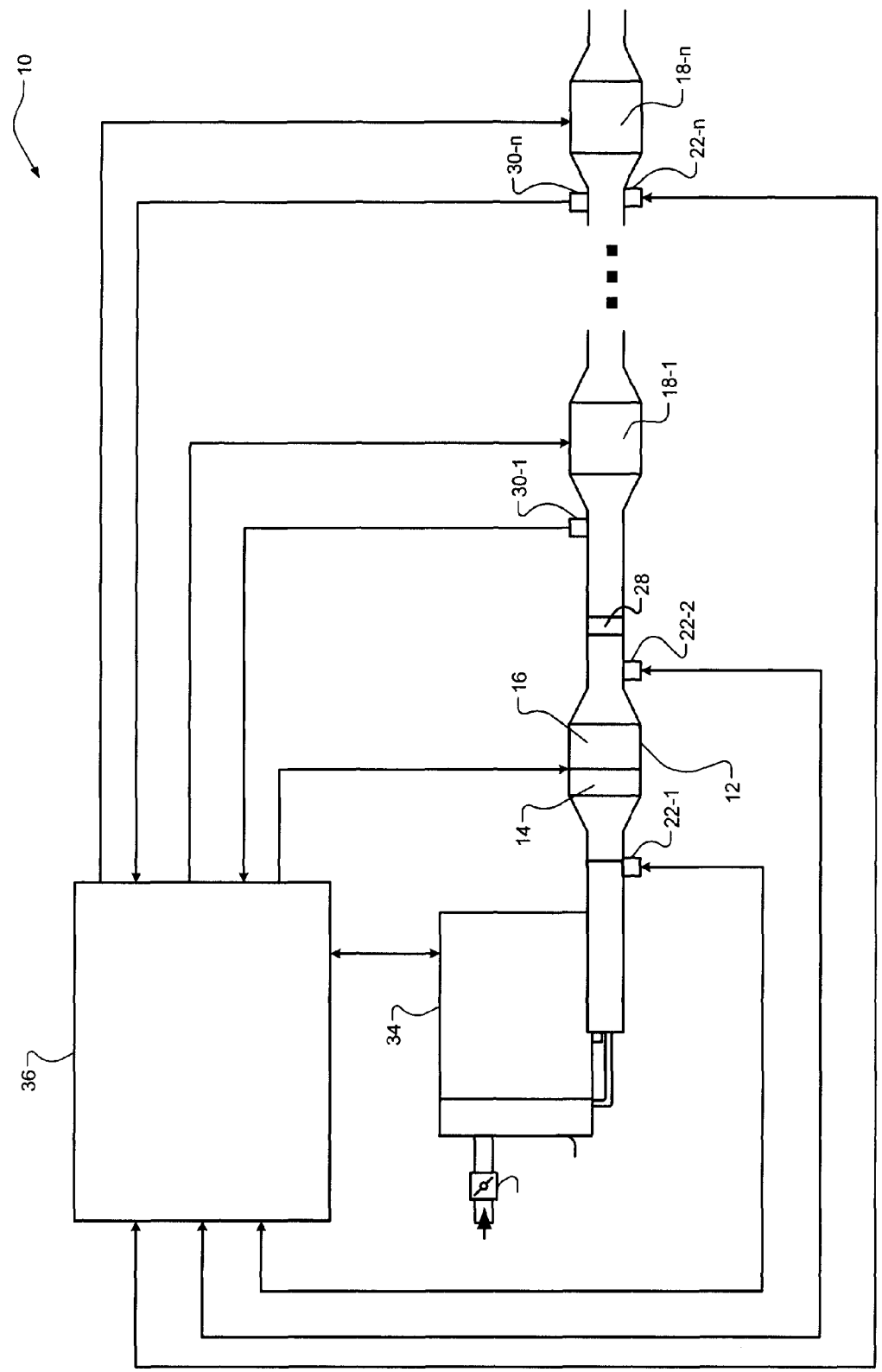
FIG. 1 is a schematic illustration of an exhaust assembly according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The fuel efficiency of an engine increases if the engine is allowed to run in a lean operation mode (for example, where there is more oxygen and less fuel). While operating in a stoichiometric mode (for example, where there is equimolar fuel and oxygen), particularly during engine cold starts, a three-way catalyst operates to reduce nitric oxide (NO) in emissions. Lean operation may be delayed (for example, by at least 200 seconds) until the temperature of a selective catalytic reduction (SCR) system reaches a temperature threshold where the SCR system can be activated for reducing NO under the lean operation.

A cold start $NO_2$ generation system according to the present disclosure reduces the delay by providing an $NO_2$ generation zone within the three-way catalyst to convert nitric oxide (NO) to nitrogen dioxide ($NO_2$) and store the $NO_2$ in the SCR system. Accordingly, the $NO_2$ generation zone is separated from a hydrocarbon (HC) oxidation zone that functions to oxidize hydrocarbons. The HC oxidation zone and $NO_2$ generation zone are separated because the presence of HC prohibits $NO_2$ generation. $NO_2$ generation is delayed until all HC is oxidized, and lean operation cannot occur until enough $NO_2$ forms to be stored in the SCR system.

The $NO_2$ is oxidized to generate ammonium nitrate (ammonia, $NH_4NO_3$) according to:

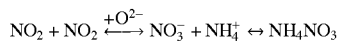

$$NO_2 + NO_2 \xrightarrow{+O^{2-}} NO_3^- + NH_4^+ \leftrightarrow NH_4NO_3$$

The ammonium nitrate is stored in the SCR system. The SCR system uses the ammonium nitrate to react with the NO in the emissions gas that flows through the exhaust system during lean operation of the engine. When the SCR system becomes thermally activated, the SCR system will reduce the ammonium nitrates using ammonia ($NH_3$) separately generated from the three way catalyst. The $NO_2$ generation zone of the three-way catalyst (and the three-way catalyst as a whole) is not required to generate $NO_2$ after the SCR system is thermally activated, and by no longer utilizing the three-way catalyst, fuel efficiency is increased. The cold start $NO_2$ generation system according to the present disclosure leverages the air/fuel ratio in the engine to control the temperature of the catalyst so that the temperature is hot enough to thermally activate the SCR system and discontinue use of the three-way catalyst, allowing for lean operation of the engine.

Referencing FIG. 1, an exhaust assembly 10 according to the present disclosure includes a three-way catalyst 12. The three-way catalyst 12 includes a hydrocarbon (HC) oxidation zone 14 and a nitrogen dioxide ($NO_2$) generation zone 16. The exhaust assembly 10 further includes a plurality of SCR systems 18-1, . . . , 18-n (referred to collectively as SCR systems 18), temperature sensors 22-1, . . . , 22-n (referred to collectively as temperature sensors 22), a mixer 28, and nitrogen oxides ($NO_x$) sensors 30-1, . . . , 30-n (referred to collectively as $NO_x$ sensors 30). The exhaust assembly 10 is mechanically connected to an engine 34 and receives exhaust gases produced from combustion. A control module 36 receives signals from each temperature sensor 22 and $NO_x$ sensor 30 and sends commands to the three-way catalyst 12 and SCR systems 18.

The quantity of HC present in the exhaust assembly 10 at the engine 34 start determines the size of the HC oxidation zone 14 and $NO_2$ generation zone 16. The HC is oxidized before $NO_2$ is generated because the HC oxidizes at a much lower temperature. When the HC has been removed from the system, the $NO_2$ generation zone 16 can begin to generate $NO_2$ from NO in the emissions gases. The mixer 28 may be implemented in the exhaust assembly 10 if active urea injection is used to supply $NH_3$ to the SCR system 18. The $NO_x$ sensor 30 placed before each SCR system 18 determines the quantity of NO in the emission gas. The temperature sensor 22 placed before each SCR system 18 determines the temperature of the emission gas entering the SCR system 18.

Figure 2:
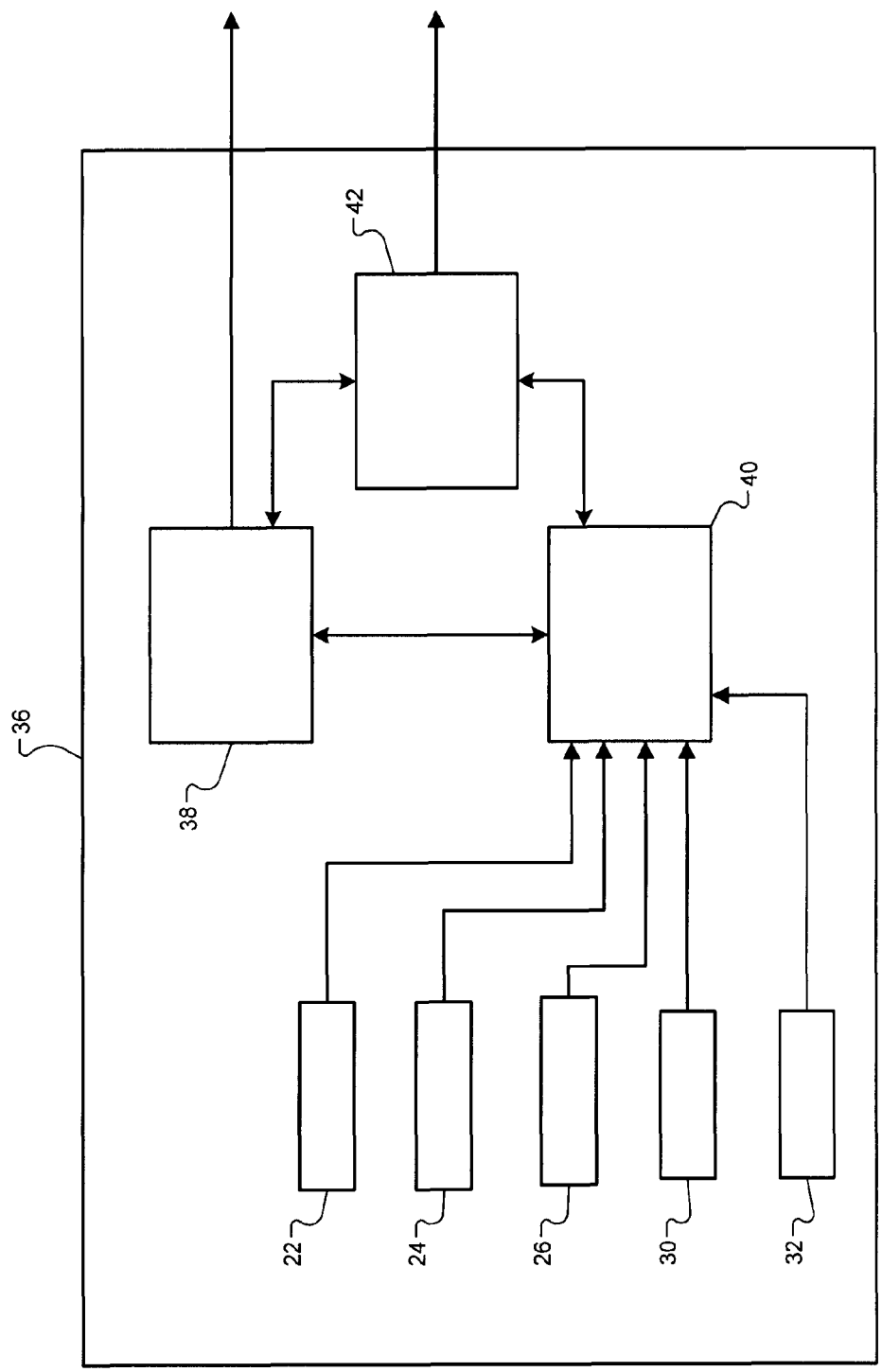
FIG. 2 is a schematic illustration of a control module of the exhaust assembly according to the present disclosure.

Referring now to FIG. 2, the control module 36 includes a catalyst control module 38, a diagnostic module 40, and a fuel control module 42. The diagnostic module 40 receives signals from the $NO_x$ sensors 30 and temperature sensors 22 to determine the level of NO and the temperature of the gases within the exhaust assembly 10. The diagnostic module 40 compares the temperature of the coolant with a first predetermined temperature threshold (for example only, 300° C.) to establish whether catalyst operation is optimal. Catalyst operation is optimal when the temperature of the coolant is greater than the first predetermined temperature threshold. The diagnostic module 40 provides a signal, to the catalyst control module 38, that indicates whether catalyst operation is optimal.

The diagnostic module 40 compares the temperature of the three-way catalyst 12 to a second predetermined temperature threshold and sends a signal, to the fuel control module 42, indicating whether the temperature of the three-way catalyst 12 is greater than or less than the second predetermined temperature threshold. The second predetermined temperature threshold may be based on the optimal temperature for NO to $NO_2$ conversion, which is dependent on the type of catalyst used and the particular characteristics of the exhaust system. For example only, the second predetermined temperature threshold may be between 275° C. and 325° C. when a perovskite catalyst is used. The optimal temperature may vary if a different type of $NO_2$ generation catalyst is used. The diagnostic module 40 further compares the temperature of the $NO_2$ generation zone 16 to a third predetermined temperature threshold and communicates the results to the fuel control module 42. The third predetermined temperature threshold for the $NO_2$ generation zone 16 may be set similarly to the second predetermined temperature threshold for the three-way catalyst 12 depending on the characteristics of the exhaust assembly 10. For example only, the temperature threshold may be between 275° C. and 325° C.

The first, second, and third predetermined temperature thresholds may either be equal to one another as described in the present disclosure, or the first, second, and third predetermined temperature thresholds may be different values or ranges of values in relation to one another if engine and exhaust parameters are varied. For example only, if a catalyst other than perovskite is used for NO to $NO_2$ conversion, the second predetermined temperature threshold may be a different value than the first and third predetermined temperature thresholds.

The catalyst control module 38 receives signals from the diagnostic module 40 indicating whether the catalyst operation is optimal. If catalyst operation is optimal, the catalyst control module 38 determines whether the SCR system 18 is thermally activated. If catalyst operation is not optimal, the catalyst control module 38 determines the HC oxidation zone 14 and the $NO_2$ generation zone 16. Determination of the HC oxidation zone 14 is a function of the amount of HC in the system, the exhaust flow, and temperature. For example only, if there is more HC in the exhaust system, the HC oxidation zone 14 will be larger in order to accommodate the catalyst volume needed to oxidize the HC in the exhaust assembly 10. The catalyst control module 38 determines the $NO_2$ generation zone 16 by subtracting the volume of the HC oxidation zone 14 from the total volume of the three-way catalyst 12. The $NO_2$ generation zone 16 is where NO is converted to $NO_2$ by using a catalyst (for example, perovskite). The catalyst facilitates the reaction of the $O_2$ and the NO to form $NO_2$.

The fuel control module 42 receives a first signal from the diagnostic module 40 if the three-way catalyst 12 temperature is greater than the first predetermined temperature threshold. The fuel control module 42 activates lean operation of the engine 34 and sends a signal to the catalyst control module 38 commanding discontinued use of the three-way catalyst 12. The fuel control module 42 receives a second signal from the diagnostic module 40 that indicates whether the $NO_2$ generation zone 16 temperature is greater than or less than the third predetermined temperature threshold. If the $NO_2$ generation zone 16 temperature is greater than the third predetermined temperature threshold, the fuel control module 42 reduces the air/fuel (A/F) ratio (for example, engine operation becomes more rich) by an $NO_2$ correction factor. The $NO_2$ correction factor is determined by the fuel control module 42 and is a function of the difference between the temperature of the $NO_2$ generation zone 16 and the third predetermined temperature threshold. If the temperature of the $NO_2$ generation zone 16 is less than the third predetermined temperature threshold, the fuel control module 42 increases the A/F ratio (for example, engine operation becomes more lean) by the $NO_2$ correction factor.

Figure 3:
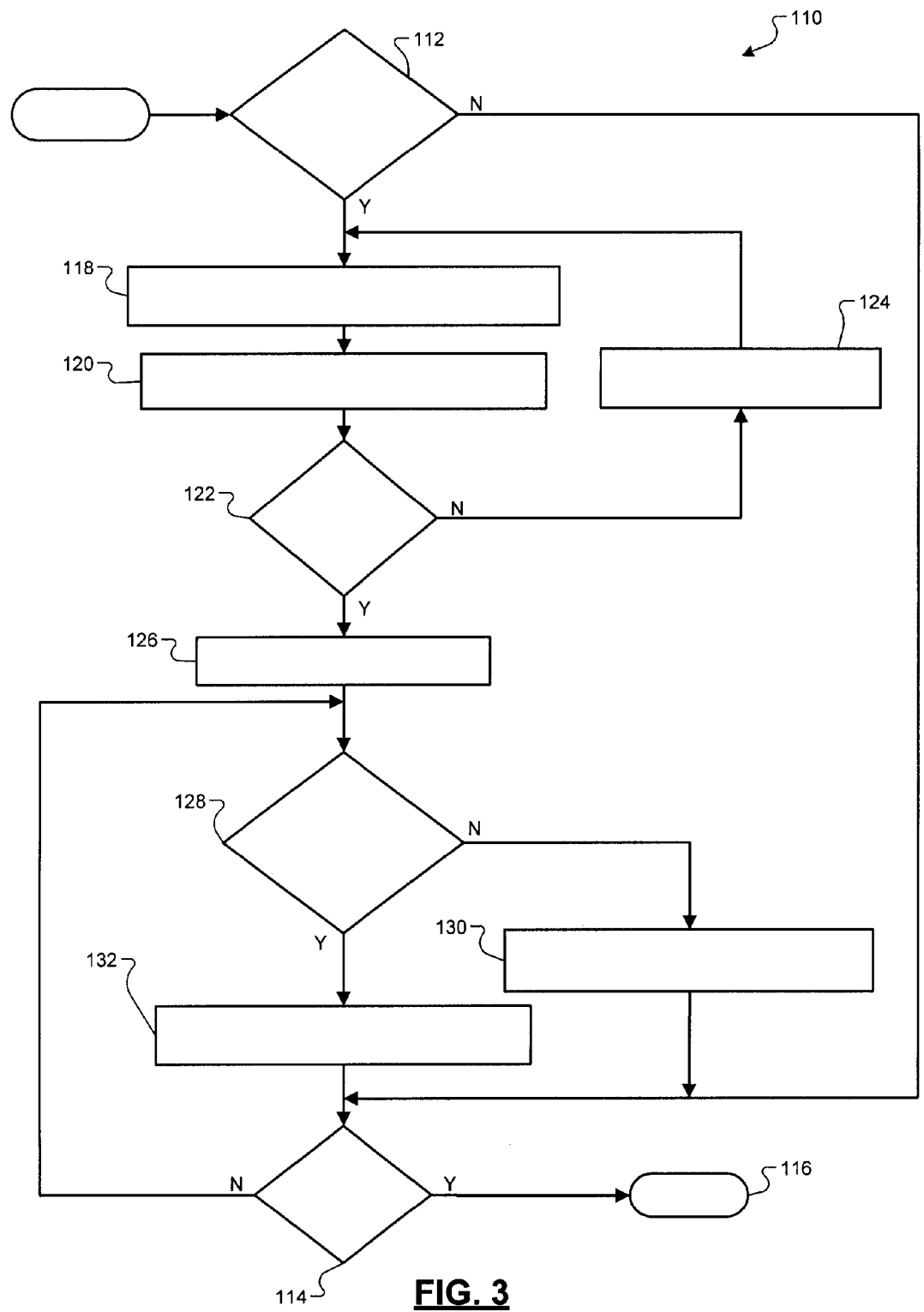
FIG. 3 is an illustration of a flow diagram for operation of a cold start $NO_2$ generation method according to the present disclosure.

Referencing FIG. 3, a cold start $NO_2$ generation method 110 begins at 112 and determines whether the coolant temperature is less than the first predetermined temperature threshold. If false, the method 110 continues to 118, and, if true, the method 110 continues to 114 and determines whether the SCR system 18 is thermally activated.

At 118, the HC oxidation zone 14 is identified, and, at 120, the $NO_2$ generation zone 16 is identified. At 122, the method 110 determines whether the an exhaust temperature in the three-way catalyst 12 is greater than the second predetermined temperature threshold. If true the method 110 continues at 126. If false, the method 110 proceeds with catalyst warm-up at 124 and, at 118 and 120, the HC oxidation zone 14 and $NO_2$ generation zone 16 are re-determined. The temperature is reevaluated to determine whether the exhaust temperature in the three-way catalyst 12 is greater than the second predetermined temperature threshold at 122.

At 126, lean operation is activated and use of the three-way catalyst 12 is discontinued. At 128, the method 110 determines whether the temperature of the $NO_2$ generation zone 16 is greater than the third predetermined temperature threshold. If true, the air/fuel ratio is increased by adding the $NO_2$ correction factor at 130. The correction factor is a function of the difference between the temperature of the $NO_2$ generation zone and the third predetermined temperature threshold. If false, the air/fuel ratio is decreased by subtracting the $NO_2$ correction factor at 132.

At 114, the method 110 determines whether the SCR system 18 is thermally activated by evaluating temperature inputs from the temperature sensor signals 22. For example only, if the reading from the temperature sensor signals 22 indicates an exhaust gas temperature greater than 200° C., the SCR system 18 will be thermally activated. If true, the method 110 exits and the exhaust assembly 10 resumes normal operation. If false, the method 110 evaluates whether the temperature of the $NO_2$ generation zone 16 is greater than the third predetermined temperature threshold at 128. The procedures at 128, 130, 132, and 114 are repeated until the SCR system 18 becomes thermally activated and the method 110 exits.

After the method 110 exits, the exhaust assembly 10 resumes normal operating conditions. The exiting of the method 110 essentially means that the exhaust assembly 10 is no longer operating in a cold start mode. For example, the three-way catalyst 12 is no longer operational for the remainder of the engine-on condition. The three-way catalyst 12 may only operate during cold start procedures. Further, the SCR system 18 continues to convert $NO_x$ via the reaction with ammonia ($NH_3$) by either using the ammonium nitrate stored in the SCR system 18 or using injected urea, allowing the engine to run lean and have higher fuel efficiency without sacrificing emission quality.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
   a first electronic circuit configured to determine a portion of a three-way catalyst that corresponds to a first zone and a portion of the three-way catalyst that corresponds to a second zone, wherein the first zone corresponds to a hydrocarbon zone and the second zone corresponds to a nitrogen dioxide zone, and wherein the first zone is positioned before the second zone in the three way catalyst such that a fluid flowing through the three-way catalyst flows through the first zone before flowing through the second zone;
   a second electronic circuit configured to determine a temperature in the nitrogen dioxide zone; and
   a third electronic circuit configured to adjust an air/fuel ratio based on the temperature in the nitrogen dioxide zone.

2. The system of claim 1, wherein the second electronic circuit is configured to determine whether an engine is operating in a cold start mode, wherein the engine is operating in the cold start mode if a coolant temperature is below a predetermined temperature threshold.

3. The system of claim 2, wherein the first electronic circuit is configured to identify a state of a selective catalytic reduction system if the engine is not operating in the cold start mode.

4. The system of claim 1, wherein the second electronic circuit is configured to determine an exhaust temperature in the three-way catalyst.

5. The system of claim 4, wherein the third electronic circuit is configured to operate an engine in a catalyst warm up mode if the exhaust temperature is less than a predetermined temperature threshold.

6. The system of claim 4, wherein the third electronic circuit is configured to operate an engine in an active lean operation mode if the exhaust temperature is greater than a predetermined temperature threshold.

7. The system of claim 6, wherein the first electronic circuit is configured to discontinue use of the three-way catalyst if the engine operates in the active lean operation mode.

8. The system of claim 1, wherein the first electronic circuit is configured to identify a state of a selective catalytic reduction system.

9. The system of claim 1, wherein a size of the hydrocarbon zone is a function of a hydrocarbon level, an exhaust flow level, and an exhaust temperature.

10. The system of claim 1, wherein the nitrogen dioxide zone converts nitric oxide to nitrogen dioxide.

11. The system of claim 1, wherein the third electronic circuit is configured to increase the air/fuel ratio by a nitrogen dioxide correction factor if the temperature in the nitrogen dioxide zone is greater than a predetermined temperature threshold.

12. The system of claim 1, wherein the third electronic circuit is configured to decrease the air/fuel ratio by a nitrogen dioxide correction factor if the temperature in the nitrogen dioxide zone is less than a predetermined temperature threshold.

13. The system of claim 1, wherein the first electronic circuit and the third electronic circuit are configured to control a selective catalytic reduction system temperature to maintain a thermally active state in a selective catalytic reduction system by increasing or decreasing the air/fuel ratio.

14. The system of claim 13, wherein the second electronic circuit is configured to determine the temperature in the nitrogen dioxide zone if the selective catalytic reduction system is not in the thermally activated state.

15. A method comprising:
   determininq a portion of a three-way catalyst that corresponds to a first zone and a portion of the three-way catalyst that corresponds to a second zone, wherein the first zone corresponds to a hydrocarbon zone and the second zone corresponds to a nitrogen dioxide zone;

wherein the hydrocarbon zone is positioned before the nitrogen dioxide zone in the three way catalyst, such that a fluid flowing through the three-way catalyst flows through the hydrocarbon zone before flowing through the nitrogen dioxide zone, determining a temperature in the nitrogen dioxide zone; and adjusting an air/fuel ratio based on the temperature in the nitrogen dioxide zone.

16. The method of claim 15, further comprising determining whether an engine is operating in a cold start mode, wherein the engine is operating in a cold start mode if a coolant temperature is below a predetermined temperature threshold.

17. The method of claim 16, further comprising identifying a state of a selective catalytic reduction system if the engine is not operating in the cold start mode.

18. The method of claim 15, further comprising determining an exhaust temperature in the three-way catalyst.

19. The method of claim 18, further comprising operating an engine in a catalyst warm up mode if the exhaust temperature is less than a predetermined temperature threshold.

20. The method of claim 18, further comprising operating an engine in an active lean operation mode if the exhaust temperature is greater than a predetermined temperature threshold.

21. The method of claim 20, further comprising discontinuing use of the three-way catalyst if the engine operates in the active lean operation mode.

22. The method of claim 15, further comprising identifying a state of a selective catalytic reduction system.

23. The method of claim 15, wherein a size of the hydrocarbon zone is a function of a hydrocarbon level, an exhaust flow level, and an exhaust temperature.

24. The method of claim 15, wherein the nitrogen dioxide zone converts nitric oxide to nitrogen dioxide.

25. The method of claim 15, further comprising increasing the air/fuel ratio by a nitrogen dioxide correction factor if the temperature in the nitrogen dioxide zone is greater than a predetermined temperature threshold.

26. The method of claim 15, further comprising decreasing the air/fuel ratio by a nitrogen dioxide correction factor if the temperature in the nitrogen dioxide zone is less than a predetermined temperature threshold.

27. The method of claim 15, further comprising controlling a selective catalytic reduction system temperature to maintain a thermally active state in a selective catalytic reduction system by increasing or decreasing the air/fuel ratio.

28. The method of claim 27, further comprising determining the temperature in the nitrogen dioxide zone if the selective catalytic reduction system is not in the thermally activated state.

* * * * *